United States Patent Office 3,833,551
Patented Sept. 3, 1974

3,833,551
INTERPOLYMERIZATION OF ETHYLENE-PROPYLENE MONOMERS
Karl Ziegler, Heinz Martin, Heinz Breil, and Erhard Holzkamp, Mulheim (Ruhr), Germany, assignors to Karl Ziegler, Mulheim (Ruhr), Germany
Continuation of application Ser. No. 514,068, June 8, 1955, now Patent No. 3,342,358. This application Aug. 13, 1971, Ser. No. 171,744
Claims priority, application Germany, Aug. 3, 1954, 434,839
The portion of the term of the patent subsequent to Dec. 3, 1980, has been disclaimed
Int. Cl. C08f 1/32, 1/36, 15/04
U.S. Cl. 260—88.2    9 Claims

ABSTRACT OF THE DISCLOSURE

The interpolymerization of ethylene and propylene alone or with other different monomers copolymerizable therewith in the presence of a Ziegler polymerization catalyst to form a solid polymer. The ethylene and propylene must be present in relative proportions ranging between 10:90% and 90:10% by weight. Preferred Ziegler catalysts are those formed by mixing an organo-metal compound, such as an organo aluminum compound, as for example, an aluminum trialkyl, or an aluminum alkyl halide with a compound such as a salt of a metal of Group IV–B, V–B, or VI–B of the Periodic System, including thorium and uranium.

---

Figure 1:
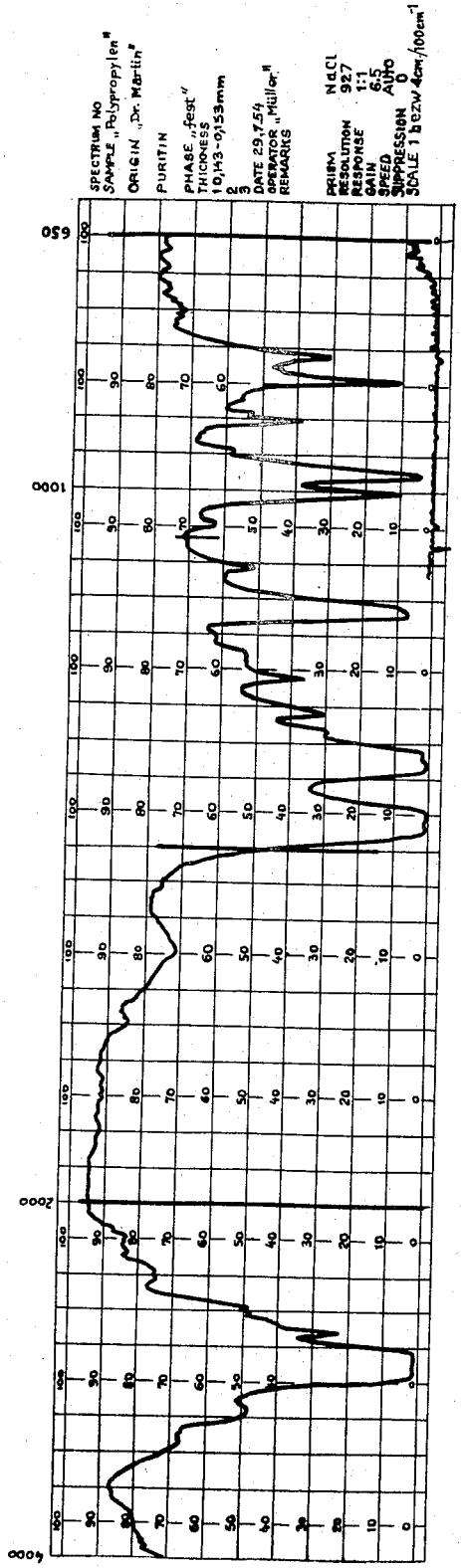

This application is a continuation of our copending application Ser. No. 514,068, filed June 8, 1955, now Pat. 3,342,358.

This invention relates to a process for polymerizing unsaturated hydrocarbons of the formula $$CH_2=CHR$$

in which R is a saturated aliphatic radical, an alicyclic radical or an aromatic radical and more specifically an alkyl, cycloalkyl or aryl radical, alone, in mixtures with each other, or in mixtures with other different monomers copolymerizable therewith.

The unsaturated hydrocarbons of the stated formula may be regarded as alpha-olefins this term being used in a broad sense and including styrene.

The pending application of one of us, Karl Ziegler, Ser. No. 469,059, filed Nov. 15, 1954, now Pat. No. 3,257,332, issued June 21, 1966, describes a method for polymerizing ethylene to high polymers using, as reaction initiators, catalysts obtained by the reaction of certain catalytic heavy metal compounds with certain catalytic metal alkyl compounds, in the dissolved state.

The polymerization of ethylene in contact with these catalysts resulted in the production of polyethylenes having molecular weights as high as 300,000 to 2,000,000 as described in said pending application, supra.

However, it is not apparent from the work with ethylene that the same or similar catalysts would be useful in the production of high molecular weight polymers of the alpha-olefins as defined in the formula given hereinabove.

The usefulness of a catalyst as initiator for the polymerization of higher homologues of ethylene cannot be predicated on, or assumed from, the usefulness thereof as initiator of ethylene polymerization. Past experience has shown that when ethylene homologues, such as propylene, were polymerized in the presence of various catalysts that had been used in the production of polyethylene of relatively high molecular weight, only low polymers of the propylene, (usually dimers, trimers and tetramers in the form of light oils or somewhat higher polymers in the form of more or less viscous lubricating oils having relatively low average molecular weights) were obtained in satisfactory yields.

The polymers of the ethylene homologues obtained by the processes known in the art consist of mixtures of homologues and of variously branched isomers. The higher the temperature used, the smaller the degree of polymerization. But even when carrying out the known processes at relatively low temperature, the products of a somewhat higher molecular weight thus obtained are still mainly liquids or liquids in admixture with amorphous solids.

One object of this invention is to provide a new process for the production of alpha-olefin polymers and copolymers.

Another object of the invention is to provide a new process for the production of alpha-olefin polymers and copolymers of high molecular weight.

A further object is to provide a new process for polymerizing alpha-olefins and mixtures containing them at moderately elevated temperatures to obtain high molecular weight, long chain polymers and copolymers.

A specific object is to provide a process for producing plastic, moldable propylene polymers and copolymers.

Still another specific object is to produce copolymers of the alpha-olefins according to the aforesaid general formula with other monomers, in particular with ethylene, in which copolymers the polyethylene component greatly predominates.

Unexpectedly, we have found that high molecular weight, plastic moldable homopolymers of the alpha-olefins and copolymers thereof with each other or with others monomers copolymerizable therewith, can be obtained by carrying out the polymerization or copolymerization in the presence of catalysts of the type described in the pending Ziegler application, supra, as initiators of the polymerization of ethylene, if the components used in preparing the catalysts are used in a controlled molar ratio.

These reactants are (A) a heavy metal compound and (B) a reducing agent for the heavy metal compound.

As (A) there are used heavy metal compounds other than heavy metal oxides either dry or hydrated, of a sub-group of groups IV to VI of the Periodic Table, i.e., compounds of the elements of titanium, zirconium, hafnium and thorium in Group IV, vanadium, tantalum and columbium in Group V, and chromium, molybdenum, tungsten and uranium in Group VI.

Various compounds of the metals may be used, for instance salts such as halides, e.g. chlorides and bromides, oxyhalides, such as the oxychlorides, complex halides, for instance, complex fluorides, for example, complex fluorides of titanium corresponding to the formula $$MeTiHal_6$$

in which Me is the metal and Hal is halogen and a specific example of which is potassium titanium fluoride $(K_2TiF_6)$, metallo-organic compounds and other organic derivatives such as alcoholates, acetates, benzoates, acetyl acetonates or the like.

The reducing agent (B) for the heavy metal compound contains at least one metal selected from the metals of Groups II and III of the Periodic Table. As the reducing agent there may be used metal alkyl, alkoxy- and aryl-compounds which comprise a substance or mixture of substances from the group of simple and complex compounds the molecules of which contain, as a central atom, an element from Group II of the Table, i.e., beryllium, magnesium, zinc, cadmium and other elements of Group II, as well as boron, aluminum and other elements of Group III of the Table. The valences of the aforesaid central atom of these metal alkyl compounds may all be linked to the same or different alkyl, alkoxy, aryl or aryloxy radicals, such as ethyl, propyl, butyl, ethoxy, phenyl, phenoxy, etc., or at least one valence of the central atom may be satisfied by a halogen or hydrogen.

The reducing agent may also be an alkali metal or alkaline earth metal, e.g., sodium or calcium, alloys of these metals, hydrides of the metals or mixtures of the metals or hydrides. The reducing agent may also be a complex of the metal hydrides mentioned with any one of the aforesaid metallo-organic compounds of metals of Groups II and III of the Periodic Table including those containing halogen or hydrogen, as well as aluminum hydrides, boron hydride, boron alkyl or boron aryl compounds, or alkyl or aryl esters of boric acid.

Preferred reducing agents are those having the general formula

[I]  $R' \cdot R''AlR'''$ in which $R'$ and $R''$ each represent a hydrocarbon radical preferably an alkyl radical, and $R''$ represents a hydrocarbon radical, hydrogen, halogen or an alkoxy group.

Other suitable reducing agents have the general formula

[II]  $A(AlR'R''XY)$ in which A is an alkali metal, $R'$ and $R''$ are hydrocarbon, particularly alkyl, radicals and X and Y are hydrogen, halogen or hydrocarbon radicals.

The polymerization catalysts may be obtained by reacting the heavy metal compound and reducing agent together in an inert solvent or diluent (i.e. a liquid which does not affect the composition of the polymer formed) in the absence of water and oxygen. It appears that the particular reducing agent used with the heavy metal compound is not critical so long as the heavy metal compound is not an oxide, in which case higher polymerization temperatures would be required, resulting in products of lower average molecular weight.

In general, polymerization catalysts obtained by reacting the heavy metal compound other than oxide with aluminum compounds of formula [I] or [II] are preferred. Those catalysts can be produced as required in a very simple manner; and when they are used polymerization of the alpha-olefin or of mixtures of copolymerizable monomers containing the alpha-olefin proceeds particularly smoothly. However, compounds of Formulae I and II in which the aluminum is replaced by magnesium or zinc are also very suitable for use as the reducing agent.

Particularly preferred catalysts are those obtained by reaction of titanium or zirconium tetrachloride or other halides of the metals with aluminum alkyls, especially aluminum triethyl or diethyl aluminum chloride as the reducing agent. Equally satisfactory results are obtained using titanium or zirconium compounds such as their tetrachlorides reduced by aluminum trioctyl, dipropyl aluminum fluoride, aluminum tri-isobutyl, aluminum di-isobutyl hydride, ethoxy-diethyl aluminum, sodium aluminum tetraethyl, and lithium aluminum di-isobutyl dihydride.

It is advantageous to prepare the polymerization catalyst by grinding the heavy metal compound and reducing agent together in a ball-type mill or in a triturator of the ball-type. For example, zirconium tetrachloride is difficultly soluble in hydrocarbons such as the saturated aliphatic hydrocarbons suitable for use as the inert solvent, and may become coated, during the reaction, with an impenetrable or difficultly penetrable crust of the reducing agent. Such crust or coating is continuously removed, as it is formed in the process, by the grinding to which the mass is subjected in the ball mill.

As indicated above, for the rapid polymerization of the alpha-olefin or copolymerizable mixtures containing them, the heavy metal compound and reducing agent are used in molar ratios that are controlled and critical. Such ratio influences both the rate or velocity of the polymerization and the molecular weight of the products. In general, the heavy metal compound and reducing agent are used in a molar ratio between 1:1 and 1:12. Specific molar ratios in the range stated may be preferred for particular heavy metal compounds and reducing agents. For instance, when the reducing agent is other than a metal trialkyl such as aluminum trialkyl, for instance when it is dialkyl aluminum chloride, the molar ratio of the reducing agent to heavy metal compound such as titanium tetrachloride, zirconium tetrachloride, etc., is preferably about 2:1.

When aluminum trialkyl is used as the reducing agent, the catalysts obtained yield polymers of higher molecular weight when, in the mixture of aluminum trialkyl and heavy metal compound from which the catalyst is prepared, the aluminum trialkyl predominates.

In preparing the catalyst from, say, magnesium or zinc alkyls, the ratio of the reducing agent to heavy metal compound is adjusted according to the different valences of the metals involved.

The polymerization is carried out at a temperature of 30–70° C. in the preferred practice of the invention. Higher temperatures up to 150° C. may be used. However, high temperatures are not usually required since heavy metal oxides are not employed. The polymerization may be allowed to proceed at normal atmospheric pressure, or under an increased pressure of 5 to 25 atmospheres.

The following examples are given to illustrate specific embodiments of the invention, it being understood that these examples are not intended as limitative.

In copolymers produced according to the invention, either the alpha-olefin or the other monomer or monomers may predominate in the copolymer molecule. Thus, we have produced copolymers of propylene and ethylene containing, by weight in the polymer molecule, 10% of propylene and 90% of ethylene. We have also produced copolymers containing, in the polymer molecule, 30% of isobutylene and 70% of ethylene. Copolymers containing, in the polymer molecule, 50% of propylene and 50% of ethylene have been prepared by the method described herein. Copolymers containing up to 70% ethylene and up to 30% propylene are contemplated.

EXAMPLE I

About 4.75 gms. of titanium tetrachloride are introduced into a solution of 5.7 gms. triethyl aluminum in 250 ml. of a Fischer-Tropsch Diesel oil (suitably freed, by hydrogenation, of unsaturated constituents and successively distilled over sodium) with stirring and under a nitrogen atmosphere. Agitation is continued for one hour at room temperature. A suspension of a brown-black substance in the Diesel oil is formed. The suspension of the catalyst thus obtained is introduced, with stirring into a 5 liter autoclave filled with nitrogen and containing 1.0 liter of the Diesel oil, and 600 gms. of dried, air-free propylene are pumped in. The temperature is raised to 70° C., stirring being continued, whereupon the pressure increases to a maximum of 21 atm. Within 72 hours, the pressure decreases to 11.0 atm. The unreacted propylene is then released from the warm autoclave and 225 gms. propylene are recovered. The solid polypropylene occurs in a paste-like suspension in the Diesel oil. The suspension is somewhat dark in color due to the presence of portions of the catalyst therein. The solvent is removed from the polypropylene by suction, and the polymer is then freed of Diesel oil by washing with acetone. The polymer is then decolorized by heating it under stirring, with methanolic hydrochloric acid. The colorless polypropylene is washed under suction with water to remove the hydrochloric acid, then with acetone to remove the bulk of the moisture, and finally dried.

An additional quantity of the polypropylene is recovered from the Diesel oil mother liquor by precipitation with acetone, and may be processed as described. A total yield of 338 gms. of granular polypropylene is obtained.

The solid, granular polypropylene may be pressed at 140° C. to obtain flexible sheets or films which appear transparent in thin films and opaque in thick layers. This propylene polymer is distinguished by a very characteristic infra-red spectrum, illustrated by FIG. 1 of the appended drawing.

EXAMPLE II

Example I is repeated, except that the propylene is replaced by an equivalent amount of alpha-butylene or of a $C_4$-hydrocarbon rich in alpha-butylene. The poly-n-butylene obtained resembles the polypropylene of Example I in appearance but is somewhat softer.

EXAMPLE III

Example I is repeated, except that an ethylene partial pressure of 1–3 atm. is maintained in the autoclave by connecting the latter with an ethylene cylinder and by carefully adjusting the valve. Because ethylene polymerizes more rapidly than propylene, the composition of the liquid phase is appropriately controlled by taking small samples and by gas analysis; to maintain an amount of ethylene in the liquid which is only a few percent (up to 10%) of the propylene. A solid copolymer is obtained. It may be formed into foils having properties between those of film-forming polyethylene and polypropylene.

EXAMPLE IV

Figure 2:
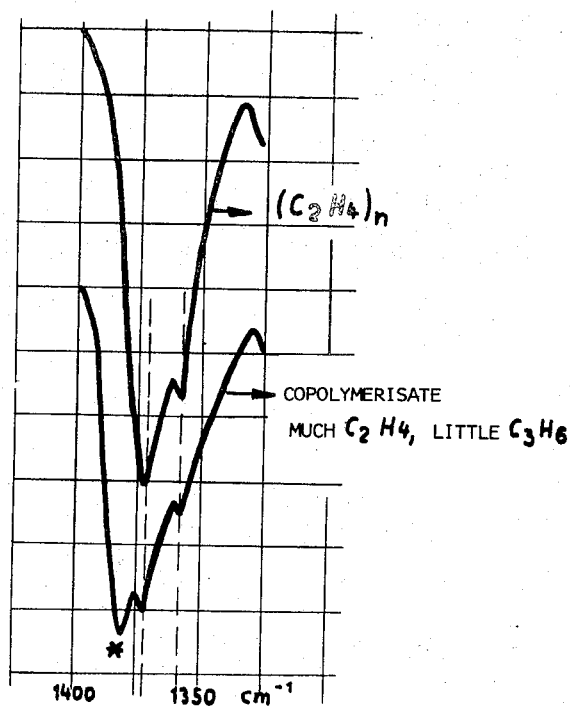

The catalyst (prepared from 3.5 g. diethyl aluminum chloride and 0.44 g. titanium tetrachloride) is dissolved in 2.5 l. Diesel oil under an atmosphere of nitrogen, and a dried, oxygen free gaseous mixture of 12 vol. percent propylene and 88 vol. percent ethylene is introduced under atmospheric pressure. The vessel is heated to about 70° C. and then, within 8 hours, the temperature is gradually raised to 90° C. A finely powdered, insoluble polymer separates, whereupon the contents of the vessel become progressively thicker. The reaction is stopped after 8 hours. About 168 g. of a solid, colorless copolymer of ethylene and propylene is separated by filtration. That the product is a copolymer is shown by the infra-red spectrum. The spectrum of the copolymer was compared with that of an ethylene homopolymer obtained in similar manner. In the range 1382 cm.$^{-1}$ there appears for the copolymer an additional absorption band (indicated by the mark-x-in the absorption spectrum of the copolymer, FIG. 2 of the drawing) which is characteristic of methyl branching. The production of the copolymer is also evidenced by careful quantitative determination of the amounts of ethylene and propylene in the gases released from the reaction vessel and condensed by cooling. It is thus readily ascertained that about 10% by weight propylene is contained in the polymer molecule.

EXAMPLE V

Example IV is repeated, except that the mixture of Diesel oil and catalyst is diluted with 250 ml. of 1-vinylcyclohexene-4 (obtained by thermal dimerization of butadiene). Pure ethylene is then pumped in and the polymerization is conducted as described for ethylene in U.S. Application Ser. No. 469,059, filed Nov. 15, 1954 and issued on June 21, 1966 at Pat. 3,257,332.

After 9 hours, 120 g. of a polymer is formed. Superficially, it resembles polyethylene. However, the results of infra-red analysis show the presence of cyclohexene radicals in the polymer molecule. Thus, a film of the product having a thickness of 120–140 microns shows an infra-red absorption band at 658 cm.$^{-1}$ which is not found in the infra-red spectrum of the similarly prepared homopolymer, polyethylene. Said band is characteristic of the double bond in cyclohexene ring. This infra-red absorption is not due to the presence of residual portion of vinylcyclohexene dissolved in the polymer, but is due to acceptance of the vinylcyclohexene into the polymer molecule, as shown by the fact that the infra-red absorption spectrum of the polymerizate does not show the very characteristic band of the vinyl group initially present in the unpolymerized vinylcyclohexene molecule. A copolymer is thus obtained, built up of units derived from both ethylene and vinylcyclohexene, the units derived from ethylene predominating. As compared to polyethylene, the copolymer has distinctly increased strength and a higher softening temperature. Apparently, it is moderately crosslinked through branches formed by the unsaturated cyclohexene side chains.

EXAMPLE VI

About 30 ml. of air-free Fischer-Tropsch Diesel oil distilled over sodium and completely saturated by hydrogenation are introduced into a small (150 ml.) ball mill arranged for working under nitrogen, together with 14.1 g. triethyl aluminum and 11.7 g. zirconium tetrachloride, and the whole is ground for 24 hours to obtain an intimate mixture. A thick black suspension is obtained. It is mixed with 1.0 liter of the same Diesel oil and introduced under nitrogen into a 5 liters autoclave equipped with a stirrer. 590 g. of propylene are then pumped in at room temperature, stirring is commenced, and the autoclave is heated to 80° C. Within 50 hours the pressure falls from the initial 23 atm. down to 14.2 atm. The reaction is interrupted, the autoclave is allowed to cool, and the excess propylene is vented. 190 g. of propylene are recovered. The mass contained in the autoclave is a thick black slurry which, after the addition of acetone and filtration under suction, becomes colorless. The residual catalyst is extracted by heating with alcoholic hydrogen chloride. After repeated washing with acetone and drying, 400 g. of a white, flocculent polypropylene are obtained. The polymer can be easily pressed into foils and rolled into a sheet.

EXAMPLE VII

The catalyst is prepared from 17.1 g. triethyl aluminum and 4.75 g. titanium tetrachloride in 250 ml. Diesel oil, and introduced, together with 1390 g. isobutylene, into a 5-liter autoclave filled with nitrogen and provided with a stirrer. The autoclave is then heated to 40° C. and the pressure, initially 5 atmo., is raised an additional 4 atm. by pumping in ethylene. The absorption of ethylene commences at once with spontaneous increase of the temperature to 55° C. An ethylene partial pressure of 4 atm. is maintained. After a total of 6 hours, 143 g. ethylene are absorbed. The valve of the ethylene cylinder is then closed, and stirring is continued until the pressure drops to only 5 atm. After cooling, the excess isobutylene is released. The mass remaining in the autoclave is a black slurry. It is diluted with acetone, filtered under suction, thoroughly washed, and further processed as in Example VI. 216 g. of the copolymer of isobutylene and ethylene is obtained, about 60 g. of the isobutylene being copolymerized as evidenced by the infrared spectrum of the copolymer, which is very different from the spectrum of ethylene homopolymers.

EXAMPLE VIII

About 17.5 g sodium hydride-triethyl boron (produced by heating sodium hydride with triethylboron in toluene until the sodium hydride is dissolved) in 200 ml. of toluene and 7.5 g. titanium tetrachloride are mixed under nitrogen in an autoclave equipped with a stirrer. 500 g. propylene are pumped in, and the autoclave is heated to 70–80° C., with stirring of the mass. Within 30 hours, the pressure falls from 20 atm. down to 11 atm. The product is worked up as in Example VI, with similar results.

EXAMPLE IX

Proceeding as in Example VI, 23 g. of a coarsely ground magnesium aluminum alloy of the composition $Mg_3Al_2$ are ground for 36 hours in 100 cc. of hexane with 8.8 g. of titanium tetrachloride. After the 36 hour grinding period, titanium tetrachloride can no longer be detected in samples of the clarified solution. Propylene is polymerized in contact with the resulting gray-black catalyst suspension, as in Example VI. From 790 g. propylene, there are obtained 660 g. of plastic polypropylene, and 130 g. of unreacted monomeric propylene. The polymeric propylene is similar to the polymer of Examples I and VI.

It will be apparent from the foregoing that the invention provides methods for producing very valuable and unique polymers and copolymers of the higher ethylene homologues. Since, in practicing the invention, various changes and modifications may be made in the details exemplified, without departing from the spirit and scope of the invention, it is to be understood that it is not intended to limit the invention except as defined in the appended claims.

What is claimed is:

1. A process which comprises interpolymerizing monomers comprising ethylene and propylene in the relative proportion between about 10:90% by weight and 90:10% by weight in the presence of a polymerization catalyst formed by mixing an organometal compound selected from the group consisting of a metal alkyl alkoxymetal or metal aryl of a metal selected from the group consisting of metals of Groups II and III of the Periodic System, alkali metals and alkaline earth metals with a compound other than the oxide of a metal selected from the group consisting of titanium, zirconium, hafnium, vanadium, tantalum, columbium, chromium, molybdenum, tungsten, thorium and uranium, and recovering the solid polymer formed.

2. Process according to claim 1 in which said organometal compound is an organo-aluminum compound.

3. Process according to claim 2 in which said organo aluminum compound is an aluminum trialkyl and in which said metal compound is a salt.

4. Process according to claim 2 in which said organo aluminum compound is an alkyl aluminum halide and in which said metal compound is a salt.

5. Process according to claim 1 in which said polymerization catalyst is a catalyst formed by mixing an aluminum trialkyl or an alkyl aluminum halide with a titanium, zirconium or vanadium salt.

6. Process according to claim 3 in which said monomers comprise ethylene and propylene in the relative proportion of about 10:90% by weight.

7. Process according to claim 3 in which said monomers comprise ethylene and propylene in the relative proportion of about 90:10% by weight.

8. Process according to claim 3 in which said monomers comprise ethylene and propylene in the relative proportion of about 50:50% by weight.

9. Process according to claim 3 in which said monomers comprise ethylene and propylene in the relative proportion of about 70:30% by weight.

References Cited

UNITED STATES PATENTS

| | | | |
|---|---|---|---|
| 2,200,429 | 5/1940 | Perrin | 260—80 |
| 2,691,647 | 3/1946 | Field | 260—88.2 |
| 3,300,459 | 1/1967 | Natta | 260—88.2 |
| 2,710,854 | 6/1955 | Seelig | 260—94.9 D |
| 2,726,234 | 12/1955 | Field et al. | 260—94.9 D |

OTHER REFERENCES

Gaylord and Mark: *Linear and Stereoregular Addition Polymers*, 1959, p. 214.

JOSEPH L. SCHOFER, Primary Examiner

A. L. CLINGMAN, Assistant Examiner